United States Patent [19]

Momose et al.

[11] 4,418,532
[45] Dec. 6, 1983

[54] SUPERCHARGED INTERNAL COMBUSTION ENGINE HAVING A COMPRESSED AIR DRIVEN EXHAUST GAS EJECTOR

[75] Inventors: Shinroku Momose, Musashino; Tokuichi Mizunuma, Hachioji, both of Japan

[73] Assignee: Fuji Jukogyo Kabushiki Kaisha, Tokyo, Japan

[21] Appl. No.: 348,557

[22] Filed: Feb. 12, 1982

[30] Foreign Application Priority Data

Feb. 16, 1981 [JP] Japan .................................. 56-21700

[51] Int. Cl.³ ....................... F02D 23/00; F02B 35/00
[52] U.S. Cl. ...................................... 60/316; 123/559
[58] Field of Search ...................... 60/307, 316, 605; 123/559

[56] References Cited

U.S. PATENT DOCUMENTS 1,628,894  5/1927  Maupin .................................. 60/316

FOREIGN PATENT DOCUMENTS 376136  7/1932  United Kingdom ................ 123/559
2086987  5/1982  United Kingdom .................. 60/307

Primary Examiner—Michael Koczo
Attorney, Agent, or Firm—Martin A. Farber

[57] ABSTRACT

An exhaust system of an internal combustion engine comprising an ejector provided in the exhaust pipe of the engine and a compressor driven by the engine. Pipes are provided for selectively supplying compressed air to a nozzle of the ejector and to the intake pipe of the engine by operating valves. The exhaust pipe of the engine is communicated with an exhaust pressure reducing chamber of the ejector. The valves are adapted to be operated by the throttle valve of the engine and are so arranged that the compressor is communicated with the ejector in part-open throttle operation and with the intake pipe in wide-open throttle operation.

1 Claim, 3 Drawing Figures

SUPERCHARGED INTERNAL COMBUSTION ENGINE HAVING A COMPRESSED AIR DRIVEN EXHAUST GAS EJECTOR

BACKGROUND OF THE INVENTION

The present invention relates to an exhaust system of a four-stroke internal combustion engine, which is provided with a system for controlling the back pressure in the exhaust port and supercharging pressure. The piston of the engine discharges burned gases against the back pressure in the exhaust stroke, which requires an amount of work. On the other hand, in intake stroke, the piston draws air-fuel mixture into the cylinder through an opening controlled by a throttle valve. The difference between the back pressure and the intake pressure is called pumping losses. In wide-open throttle operation, the intake pressure in the induction passage is relatively high, the back pressure is nearly equal to the atmospheric pressure. Therefore, the pumping losses in wide-open throttle operation are small.

However, in part-open throttle operation, the intake pressure in the induction passage is lower than that in the wide-open throttle operation. Generally, in part-open throttle operation. Therefore, the pumping losses increase in part-open throttle operation, which causes decrease of the thermal efficiency resulting in deterioration of fuel consumption.

SUMMARY OF THE INVENTION

The object of the present invention is to provide an exhaust system for an engine which is capable of decreasing the back pressure in part-open throttle operation and also performing supercharging in wide-open throttle operation, whereby the pumping losses may be decreased and the power of the engine may be increased.

Means for decreasing the back pressure are disclosed in Japanese patent publications Nos. 51-3844 and 51-3845.

The system of the present invention is characterized by providing an ejector in the exhaust pipe and a compressor which acts as an compressor for operating the ejector in part-open throttle operation and as a supercharger in wide-open throttle operation.

According to the present invention, there is provided an intake and exhaust system of an internal combustion engine having an intake pipe and an exhaust pipe, comprising an ejector provided adjacent to the exhaust pipe, the ejector consisting of a nozzle, an exhaust pressure reducing chamber, and a suction throat pipe adjacent to the nozzle, a compressor driven by the engine, a conduit for communicating the compressor with the nozzle of the ejector, pipe means for communicating the exhaust pipe with the exhaust pressure reducing chamber, an exhaust pipe connected to the suction throat pipe, a supercharging pipe for communicating the compressor with the intake pipe, and changeover valve means provided in the supercharging pipe for communicating compressor with the intake pipe in wide-open throttle operation and with the ejector in part-open throttle operation.

The present invention will be more apparent from the following description made with reference to the accompanying drawings.

DETAILED DESCRIPTION OF THE PREFERRED EMBODIMENTS

Figure 1A:
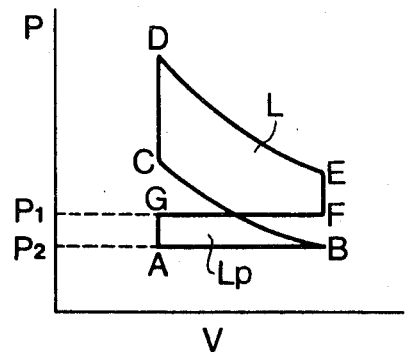
FIG. 1a is an indicator diagram of a conventional engine.
Figure 1B:
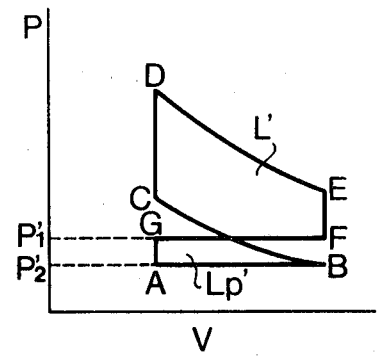
FIG. 1b is an indicator diagram of an engine according to the present invention.

Referring to FIG. 1a, the back pressure is $P_1$ and intake pressure $P_2$. The pumping losses $L_p$ is represented by the area A-B-G and the work L is represented by the area C-D-E-F. In the indicator diagram of FIG. 1b according to the present invention, the symbols of $L'$ and $L_p'$ correspond to those of L and $L_p$ above mentioned. The back pressure $P_1'$ is lower than the back pressure $P_1$. Conditions for producing the same power by the engine of the present invention as the conventional engine may be written as follows, $$L - L_p = L' - L_p' - L_c \quad \ldots (1)$$

where
$L'$ is the work,
$L_p'$ is the pumping losses,
$L_c$ is the compressor driving losses.

If the friction loss plus mechanical losses $L_f$ of both engines are equal, the equation becomes $$L - L_p - L_f = L' - L_p' - L_f - L_c \quad \ldots (2)$$

which may be written in the form $$\frac{L - L_p - L_f}{L} = \frac{L' - L'_p - L_f - L_c}{L'} \cdot \frac{L'}{L}$$

This equation may be written into the form of efficiency equation $$\eta = \eta' \frac{L'}{L} \quad (3)$$

In order to obtain $\eta' > \eta$, the condition of $$\frac{L'}{L} < 1$$

is necessary. Accordingly, from the equation (1), necessary condition is $$L_p > L_p' + L_c \quad \ldots (4)$$

Since the pumping losses $L_p$ is proportional to $(P_1-P_2)$ and the compressor driving losses $L_c$ is proportional to the pressure of the ejector $P_c$, the equation (4) may be rewritten in the form $$\beta(P_1-P_2) > \beta(P_1'-P_2') + \gamma P_c \quad \ldots (5)$$

where $\beta$ is a constant dependent on engine specifications, $\gamma$ is a constant dependent on ejector specifications and air flow velocity.

The back pressure $P_1'$ is decided by the efficiency of the ejector. Thus, the back pressure $P_1'$ is function of $\gamma P_c$ and ejector specifications (E), which is written in the form $$P_1' = F(\gamma P_c' E) \qquad \ldots (6)$$

Thus, the most preferable efficiency $\eta'$ may be obtained by selecting the specifications for satisfying the equation (5).

Figure 2:
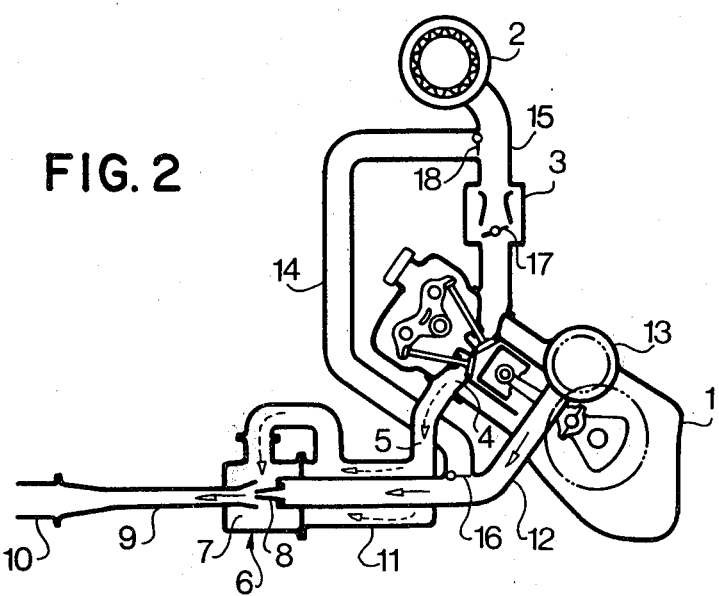
FIG. 2 is a sectional view of an embodiment of the present invention.

Referring to FIG. 2 showing an embodiment of the present invention, an engine 1 is provided with an air cleaner 2 communicated with a carburetor 3 which is communicated with an intake port of the engine. An exhaust pipe 5 communicated with an exhaust port 4 is communicated to an ejector 6. The ejector 6 comprises an exhaust pressure reducing chamber 7, a nozzle 8 extending into the exhaust pressure reducing chamber 7 and a suction throat pipe 9 one end of which extends into the exhaust pressure reducing chamber 7 facing the nozzle 8 and the other end of which is connected to an exhaust pipe 10. The nozzle 8 is communicated with a compressor 13 through a pipe 12. The compressor 13 is adapted to be driven by the engine through the crankshaft by means of gears or chains in the conventional manner. A part of the exhaust pipe 5 constitutes a heat exchanger 11 adjacent to and situated upstream the ejector 6. The heat exchanger 11 comprises an outer tube which is formed by a part of the exhaust pipe 5 and an inner tube which is a part of the pipe 12. A supercharging pipe 14 is communicated between the pipe 12 and an intake pipe 15 at the induction side of the carburetor 3. A changeover valve 16 is provided in an opening for the pipe 12 and a changeover valve 18 is provided in an opening for the intake pipe 15. Both valves are adapted to be operated in conjunction with a throttle valve 17 in the carburetor 3. Both valves are closed in part-open throttle operation and opened in wide-open throttle operation for communicating the pipe 12 with the supercharging pipe 14 and further with the intake pipe 15.

In part-open throttle operation, the compressor 13 is communicated with the ejector 6. Thus, compressed air generated by the compressor 12 jets from the nozzle 8 at a high speed to create suction in the suction throat portion between the nozzle 8 and the pipe 9. Accordingly, the back pressure in the exhaust port 4 is reduced.

When the throttle valve 17 is widely opened, changeover valves 16 and 18 are opened to communicate the compressor 13 with the intake pipe 15 via conduit 12 and supercharging pipe 14. Thus, compressed air is supplied to cylinders of the engine in intake stroke, namely supercharging is performed in wide-open throttle condition.

From the foregoing, it will be understood that the present invention provides a system which reduces the back pressure by the ejector provided in the exhaust pipe whereby the pumping losses may be decreased and also increase the power of the engine by the supercharging.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. An intake and exhaust system of an internal combustion engine having an intake pipe and an exhaust pipe, comprising an ejector provided adjacent to said exhaust pipe, said ejector consisting of a nozzle, an exhaust pressure reducing chamber, and a suction throat pipe adjacent to said nozzle, a compressor driven by said engine, a pipe for communicating said compressor with said nozzle of said ejector, conduit means for communicating said exhaust pipe with said exhaust pressure reducing chamber, an exhaust pipe connected to said suction throat pipe, a supercharging pipe for communicating said compressor with said intake pipe, and changeover valve means provided in said supercharging pipe for communicating said compressor with said intake pipe in wide-open throttle operation and with said ejector in part-open throttle operation.

* * * * *